US008799802B2

(12) United States Patent  
Mäkelä

(10) Patent No.: US 8,799,802 B2  
(45) Date of Patent: Aug. 5, 2014

(54) APPARATUS, METHOD AND COMPUTER PROGRAM PRODUCT ENABLING ZOOM FUNCTION WITH MULTI-FUNCTION KEY INPUT THAT INHIBITS FOCUS ON A TEXTUALLY-RESPONSIVE ELEMENT

(75) Inventor: Mikko K. Mäkelä, Tampere (FI)

(73) Assignee: Nokia Corporation, Espoo (FI)

( * ) Notice: Subject to any disclaimer, the term of this patent is extended or adjusted under 35 U.S.C. 154(b) by 1954 days.

(21) Appl. No.: 11/173,781

(22) Filed: Jun. 30, 2005

(65) Prior Publication Data

US 2007/0006092 A1 Jan. 4, 2007

(51) Int. Cl.
*G06F 3/048* (2013.01)
*G06F 3/00* (2006.01)
*G06G 5/00* (2006.01)
*G06F 3/033* (2013.01)

(52) U.S. Cl.
USPC ........... 715/773; 715/708; 715/780; 715/802; 345/156; 345/168; 345/172

(58) Field of Classification Search
USPC .......... 715/773, 708, 780, 802; 345/156, 168, 345/172
See application file for complete search history.

(56) References Cited

U.S. PATENT DOCUMENTS

| 7,019,731 | B2* | 3/2006 | Nishiyama | 345/156 |
| 2001/0011995 | A1* | 8/2001 | Hinckley et al. | 345/156 |
| 2001/0048589 | A1* | 12/2001 | Brandenberg et al. | 361/683 |
| 2004/0250220 | A1 | 12/2004 | Kalenius | 715/864 |
| 2004/0257341 | A1* | 12/2004 | Bear et al. | 345/157 |

FOREIGN PATENT DOCUMENTS

| EP | 1 289 237 A2 | 3/2003 | |
| EP | 1734727 A1 * | 12/2006 | G06F 1/16 |

OTHER PUBLICATIONS

Staffan Bjork, Lars Erik Holmquist, Johan Redstrom, Ivan Bretan, Rolf Danielsson, Jussi Karlgrn, Kristopher Franzen WEST: A Web Browser for Small Terminals CHI Letters vol. 1, 1 UIST '99 pp. 187-196.*

* cited by examiner

*Primary Examiner* — Andrea Long
(74) *Attorney, Agent, or Firm* — Alston & Bird LLP (57) ABSTRACT

Disclosed is a method, a computer program, a device, an apparatus and a browser operable with a user interface having an output display and an input to receive signals from a plurality of user inputs, where at least one user input is a multi-function input operable in a first mode to provide a display control input, and in a second mode to provide another function, such as alphanumeric character input and, when operating the at least one user input in the first mode, to inhibit operation of the at least one user input in the second mode due to a change in content of the display in response to operation in the first mode. The first mode may be, as non-limiting examples, a zoom mode or a scroll mode.

37 Claims, 5 Drawing Sheets

FIG.1

Prior Art

FIG.2A

Prior Art

FIG.2B

Prior Art

FIG.2C

Prior Art

APPARATUS, METHOD AND COMPUTER PROGRAM PRODUCT ENABLING ZOOM FUNCTION WITH MULTI-FUNCTION KEY INPUT THAT INHIBITS FOCUS ON A TEXTUALLY-RESPONSIVE ELEMENT

TECHNICAL FIELD

The teachings in accordance with the exemplary embodiments of this invention relate generally to browsers capable of displaying pages containing textual elements and, more specifically, relate to browsers used with mobile devices having a limited display screen area and a limited user input capability.

BACKGROUND

When using a mobile device, such as a cellular telephone, having a limited display screen area certain accommodations can be made for displaying image content to a user. The image content may be obtained from a remote content provider, such as via the Internet using an Internet browser, or it may be generated locally in the device itself.

One non-limiting example of a mobile device browser of interest to the teachings of this invention is operable as an application that runs under a Series 60™ mobile device software platform that is provided by the assignee of this patent application. For example, the browser may be embodied as a full HTML browser (e.g., HTML 4.01, WAP 2.0).

The browser handles image maps such that, in some cases, initially an entire document image map is displayed as one selectable element on a page, and upon activation of an enlarge or "zoom" function an enlarged portion of the page is displayed to the user. In Series 60 internet browser, and in mobile browsers in general, there can be a limited user input capability in the user interface, e.g., a limited number of input keypad keys. However, there is a need for different types of keyboard shortcuts that need to be placed on, for example, an ITU-T type of keyboard or keypad (i.e., on the keys 1-9, 0, * and #).

Because of the limited set of user input keys certain problems may arise during the use of a browser or some other application that displays information to the user, where the user is expected to navigate within the displayed information using the limited keypad key set.

SUMMARY OF THE EXEMPLARY EMBODIMENTS

The foregoing and other problems are overcome, and other advantages are realized, in accordance with the non-limiting and exemplary embodiments of this invention.

Disclosed is a method, a computer program, a device, an apparatus and a browser operable with a user interface having an output display and an input to receive signals from a plurality of user inputs, where at least one user input is a multi-function input operable in a first mode to provide a display control input, and in a second mode to provide another function such as, but not limited to, alphanumeric character input and, when operating the at least one user input in the first mode, to inhibit operation of the at least one user input in the second mode due to a change in content of the display in response to operation in the first mode. The first mode may be, as non-limiting examples, a zoom mode or a scroll mode.

BRIEF DESCRIPTION OF THE DRAWINGS

The foregoing and other aspects of the teachings of this invention are made more evident in the following Detailed Description, when read in conjunction with the attached Drawing Figures, wherein.

DETAILED DESCRIPTION

Figure 1:
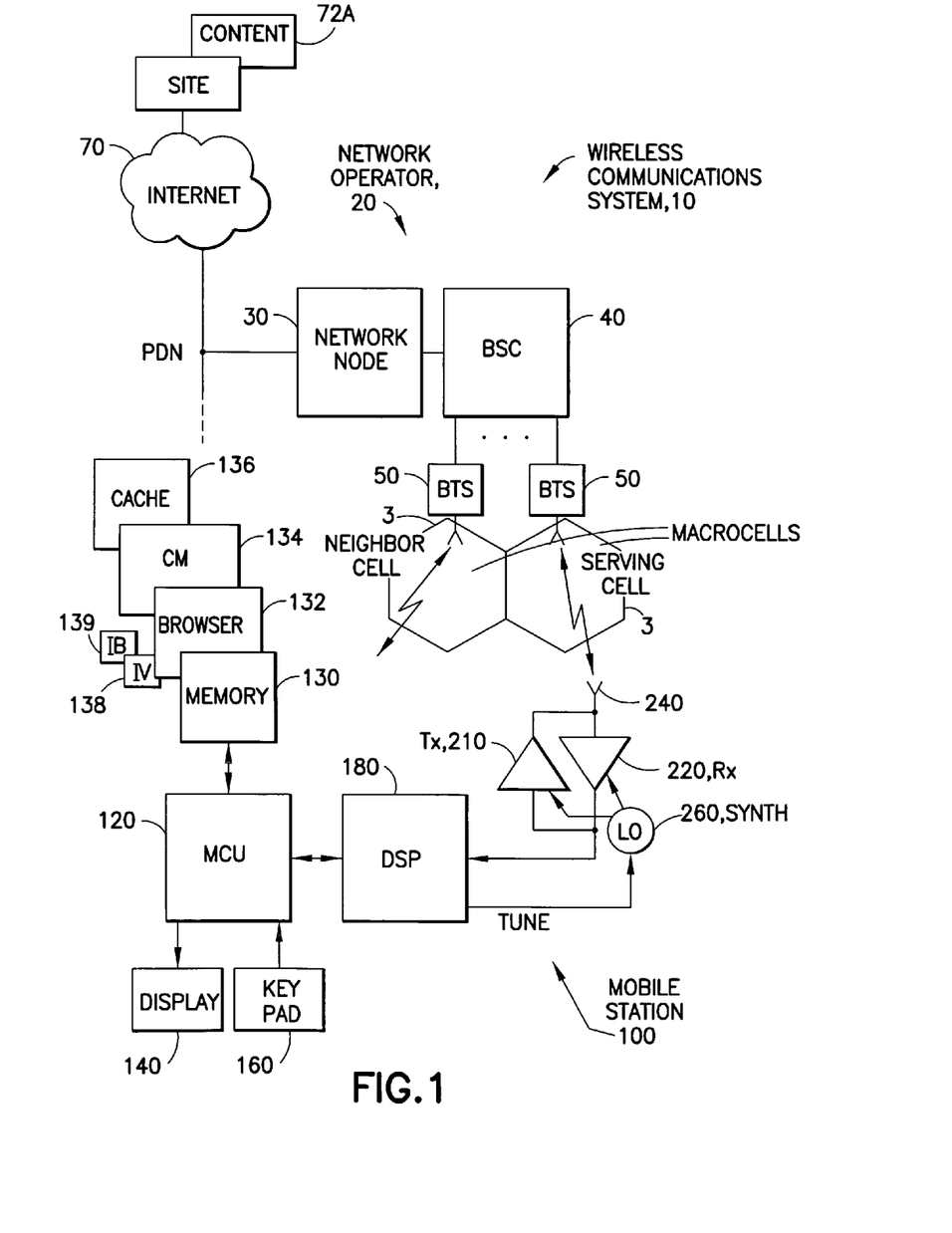
FIG. 1 is a system level block diagram of a mobile station and a wireless network operator, and represents one suitable embodiment for practicing the embodiments of this invention.

By way of introduction, and referring to FIG. 1, there is shown as a simplified block diagram an embodiment of a wireless communications system 10 having at least one electronic device, such as a mobile station (MS) 100, that is suitable for practicing the embodiments of this invention. FIG. 1 also shows an exemplary network operator 20 having, for example, a node 30 for connecting to a telecommunications network, such as a Public Packet Data Network or PDN, at least one base station controller (BSC) 40 or equivalent apparatus, and a plurality of base transceiver stations (BTS) 50, also referred to as base stations (BSs), that transmit in a forward or downlink direction both physical and logical channels to the mobile station 100 in accordance with a predetermined air interface standard. A reverse or uplink communication path also exists from the mobile station 100 to the network operator, which conveys mobile originated access requests and traffic. A cell 3 is associated with each BTS 50, where one cell will at any given time be considered to be a serving cell, while an adjacent cell(s) will be considered to be a neighbor cell.

It should be appreciated that while FIG. 1 shows the mobile station 100 primarily in the context of a cellular wireless communications system, in other embodiments of this invention the mobile station 100 may instead, or in addition, interface with a wireless local area network (WLAN) and/or with a Bluetooth™ wireless network (either RF or IR), or with any other type of wireless communications network.

The air interface standard can conform to any suitable standard or protocol, and may enable both voice and data traffic, such as data traffic enabling Internet 70 access and web page downloads. Coupled via the Internet 70 is assumed to be at least one content provider site 72 having content 72A that is downloadable to the MS 100. The content may comprise an image that is displayable on a MS 100 display 140, and may be delivered as HTML pages or as KHTML pages.

The air interface standard may be compatible with a code division multiple access (CDMA) air interface standard, such as one known as cdma2000, although this is not a limitation upon the practice of this invention as the invention may be practiced using any air interface protocol (including GSM and UMTS) that supports the delivery of digital data to the MS 100.

In general, the various embodiments of the MS 100 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable and handheld units or terminals that incorporate combinations of such functions.

The MS 100 typically includes a control unit or control logic, such as a microcontrol unit (MCU) 120 having an output coupled to an input of the display 140, such as an LCD or a plasma display, and an input coupled to an output of a user input device or devices, as non-limiting examples, a keyboard or keypad 160. The keypad may be an ITU-T type of keyboard or keypad having the set of keys 1-9, 0, * and #, as are typically found on touch-tone types of telephone apparatus). In other embodiments the display 140 may be a touch sensitive display, and may also then comprise a part of, or all of, the user input device, whereby an image of an ITU-T type of keypad can be displayed to the user, as opposed to the use of a physical keypad 160.

The MCU 120 is assumed to include or be coupled to some type of a memory 130, including a non-volatile memory for storing an operating program, such as an operating system, and other information, as well as a volatile memory for temporarily storing other data such as scratchpad memory, received content, etc. The operating program is assumed, for the purposes of this invention, to enable the MCU 120 to execute the software routines, layers and protocols required to implement the methods in accordance with this invention, as well as to provide a suitable user interface (UI), via display 140 and keypad 160, with a user. Although not shown, a microphone and speaker are typically provided for enabling the user to conduct voice calls in a conventional manner.

The MS 100 can also include a wireless section that includes a digital signal processor (DSP) 180, or equivalent high speed processor or logic, as well as a wireless transceiver that includes a transmitter 210 and a receiver 220, both of which are coupled to an antenna 240 for communication with the network operator. At least one local oscillator, such as a frequency synthesizer (SYNTH) 260, is provided for tuning the transceiver. Data, such as digitized voice and packet data, is transmitted and received through the antenna 240.

The memory 130 may be of any type suitable to the local technical environment and may be implemented using any suitable data storage technology, such as semiconductor-based memory devices, magnetic memory devices and systems, optical memory devices and systems, fixed memory and removable memory. The data processors 120, 180 may be of any type suitable to the local technical environment, and may include one or more of general purpose computers, special purpose computers, microprocessors, DSPs and processors based on a multi-core processor architecture, as non-limiting examples.

The memory 130 is assumed to include software for implementing an Internet browser 132 that includes a cache manager (CM) function 134 for interacting with a cache 136 wherein content is stored, such as the content 72A downloaded from the site 72. Associated with the browser 132 is assumed to be an image viewer (IV) application 138, or some corresponding functionality, that operates to control the display of information on the display 140. Associated with the image viewer application 138 is a display or image buffer (IB) 139, wherein data representing a displayed page or document is stored and may be manipulated by the image viewer application 138.

As non-limiting examples, the browser 132 may be HTTP (Hypertext Transfer Protocol) compliant and/or may also be compliant with, as an example, an open source KHTML rendering engine.

In accordance with certain exemplary embodiments of this invention the browser 132 software is enhanced to provide an ability for a user to more efficiently navigate image data.

Before describing the invention in further detail, and in order to obtain a better appreciation for the benefits that are realized through the use of the non-limiting embodiments of this invention, a brief discussion will be made of one example of the browser 132 and image viewer application 138 displaying information to the user.

As was noted above, in the Series 60 internet browser, and mobile browsers in general, there are a very limited number of keys, especially if the user interface is implemented using an ITU-T keyboard. Typically, and due to the limited number of keys in the available set of keys, there may several types of shortcuts that are desired to be implemented using the same keys. For example, when a displayed textual input element is focused, i.e., when a displayed text field is highlighted, pressing a numeric key causes the entry of a corresponding alphanumeric character (depending on the mode) into the textual input element.

Figure 2A:
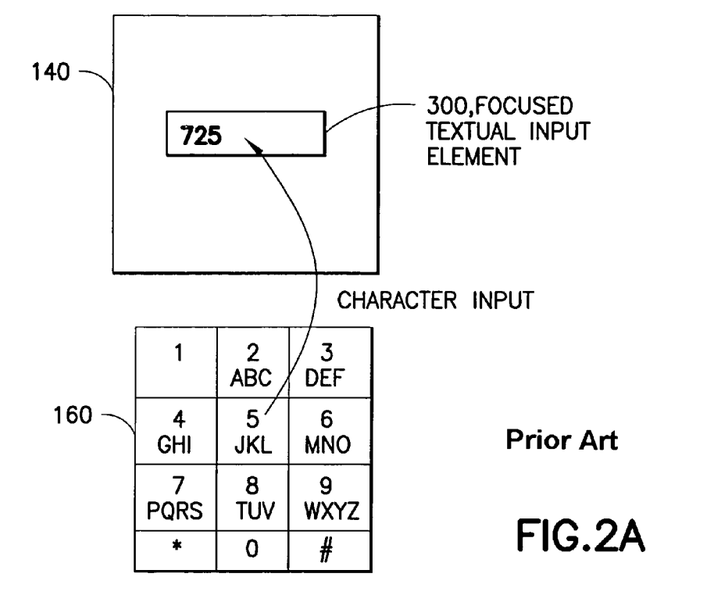
FIGS. 2A-2G illustrate a method of using a user input device having a limited set of keys for zooming into displayed information in accordance with the exemplary embodiments of this invention.

For example, and referring to FIG. 2A, if the textual field or textual input element 300 is focused or highlighted on the display 140, pressing the key "5" on the keypad 160 causes the number 5 to be entered into the textual input element 300. Note that the specific keypad 160 shown in FIG. 2A is exemplary, as there are other keypad types having different associations of characters to specific keys.

Figure 2B:
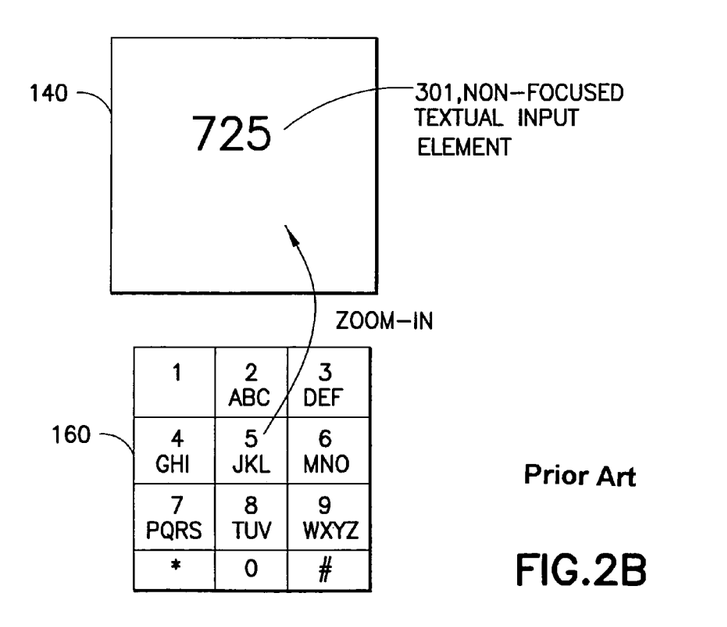

When the focus is not on the textual input element, then the numeric keys function differently and may be used for entering application (e.g., browser 132) shortcuts. For example, the image viewer application 138 associated with the Series 60 browser 132 responds to depressing the "5" key to zoom-into (display an enlarged portion of) a displayed document or page, while depressing the "0" key causes it to zoom out. This operation is depicted in FIG. 2B, where when there is a non-focused textual input element 301, depressing the "5" key causes the image viewer application 138 to zoom-into the displayed document.

However, the foregoing shortcut types can conflict with each other. For example, when the document is zoomed in, the amount or number of visible focusable elements can be reduced since any such elements near edges of the display 140 can disappear from view. Because of this, during a zoom-in operation the focus can be shifted automatically by the image viewer application 138 to a different (still viewable) element than the original element (which may have been lost from view).

Figure 2C:
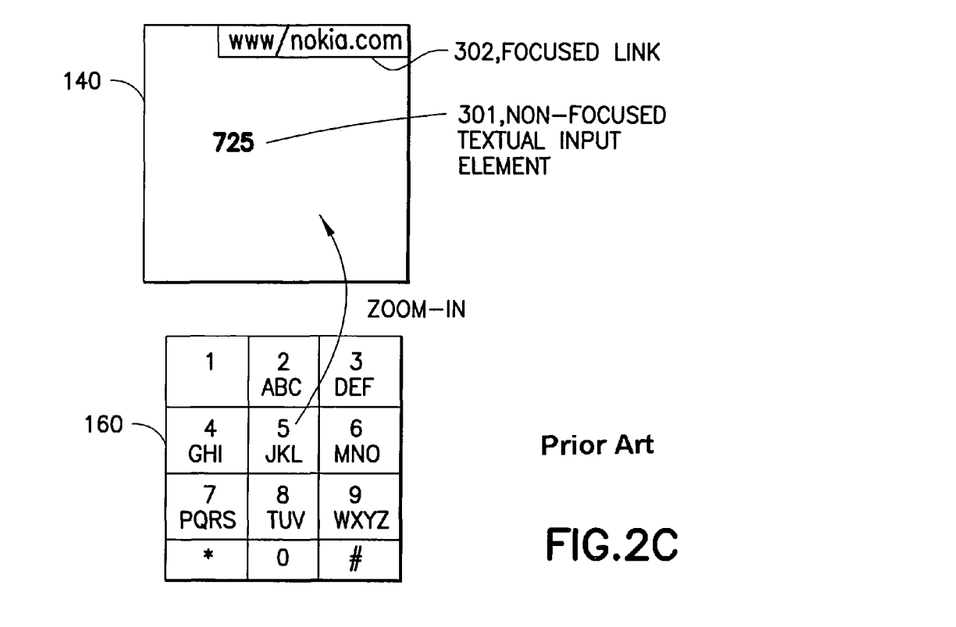
Figure 2D:
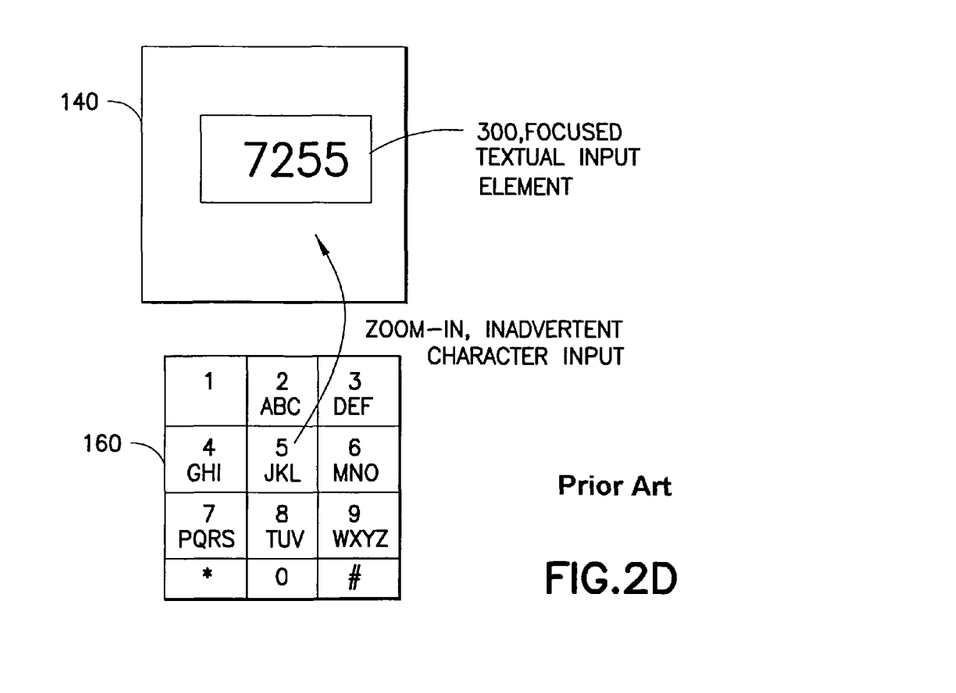

Referring to FIG. 2C, assume that the focus was initially on a link 302 (e.g., a URL for www.nokia.com), and that the user zooms in using the "5" key shortcut. In this case it may happen that the originally focused link 302 is no longer viewable on the display 140 (FIG. 2D), and the focus is then moved automatically to another focusable element that is still shown on the display 140, for example to the textual input element 300. However, if the user desires to zoom-in further and presses the "5" key again, the result is that the document is not zoomed in, but instead the focused textual input element 300 is activated and an alphanumeric character (e.g., another "5", or a corresponding letter "J", "K" or "L" depending on the current state of an alphanumeric mode setting) appears into it. This is undesirable from a user interface point of view, particularly as zooming in/out is an often used operation when viewing large documents on a small display screen associated with a mobile device such as the MS 100.

That is, at least one or more of the keys of the keypad 160 are multi-functional and may be used in one mode of operation for a display control function, and in another mode of operation for entering information, such as alphanumeric information, to an application.

In accordance with the non-limiting embodiments of this invention, when the "zoom-in" function is accessed from the keyboard 160 shortcut, the image viewer application 138 operates to ensure that after the zoom-in operation the focus is not placed onto a textual input element. This desirable mode of operation can be achieved in various ways.

Figure 2E:
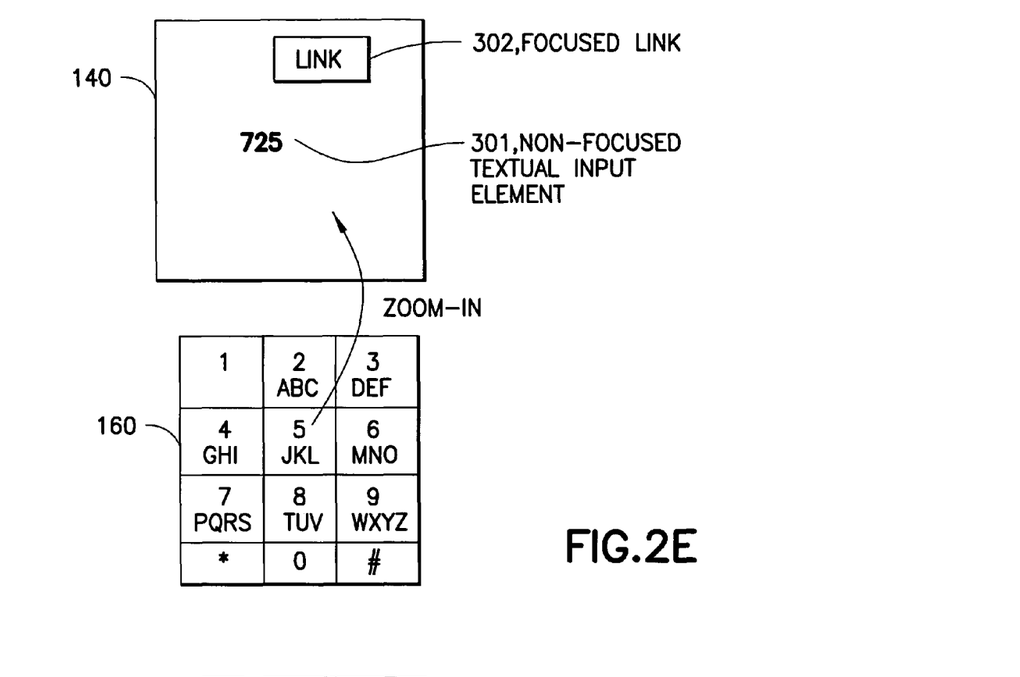

For example, after using the "zoom-in" keyboard shortcut, the image viewer application 138 examines the state of the image buffer 139, and ensures that the focus is not shifted onto any textual input element that may be present. For example, assume that after the zoom-in operation the image buffer 139 contains data corresponding to a textual input element and to another focusable element, such as a link, that are viewable on the display 140. In this case the image viewer application 138 automatically places the focus on the link 302, and not on the textual input element 301 (see FIG. 2E). In this case, and assuming that the user again depresses the "5" shortcut to zoom-in still further, or presses the "0" shortcut to zoom-out, a character is not inadvertently entered into the non-focused textual input element 301.

It should be noted that if, after using the "zoom-in" keyboard shortcut, the only focusable element(s) shown are textual input element(s), then focus may be placed onto one of these textual input element(s).

Figure 2F:
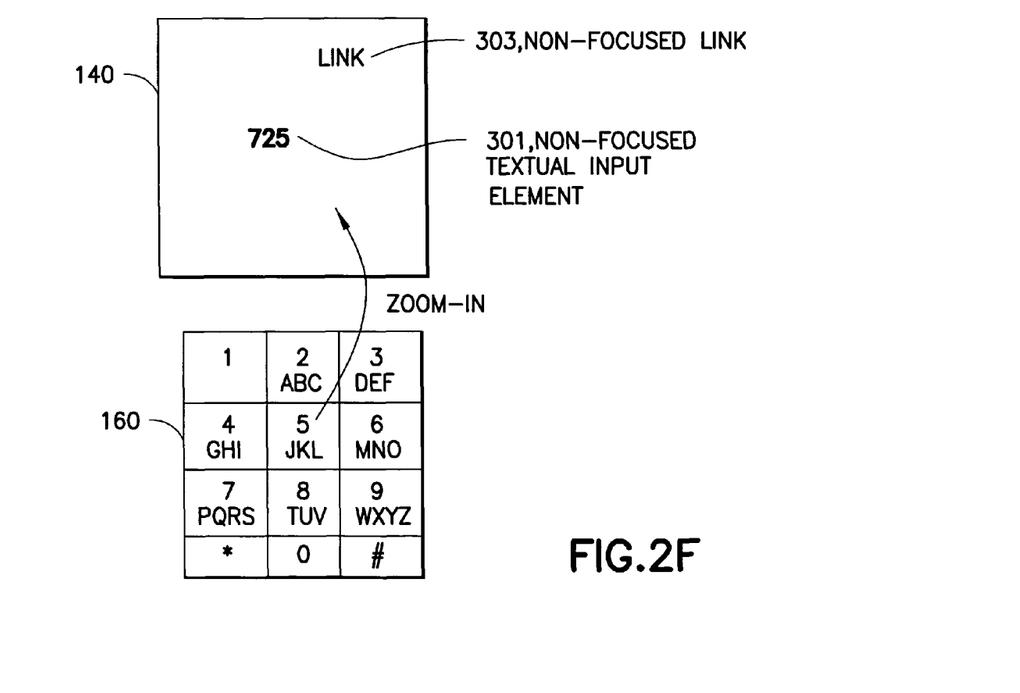

Further by example, after using the "zoom-in" keyboard shortcut, the focus is removed altogether by the image viewer application 138. In this case the focus can be restored to one of the displayable elements if, for example, the user begins navigating (e.g., scrolls up or down, or left or right) within the displayed image. This mode of operation is depicted in FIG. 2F, where in response to the use of the "zoom-in" keyboard shortcut the image viewer application 138 displays a non-focused link 303 and the non-focused textual input element 301.

Figure 2G:
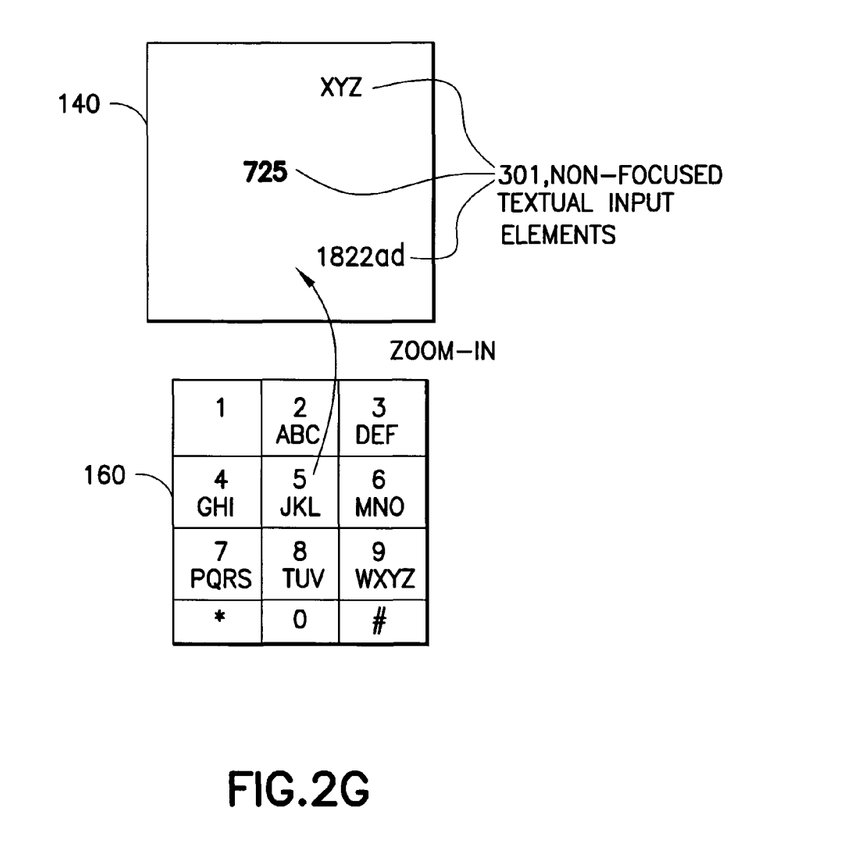

The foregoing exemplary modes of operation can be combined as well. For example, if after using the "zoom-in" keyboard shortcut there is at least one focusable element other than a textual input element visible on the display 140, focus is placed on one of the focusable non-textual input elements (as in FIG. 2E). If, however, after using "zoom-in" keyboard shortcut there are no viewable focusable element(s), other than textual input element(s), the focus is removed altogether by the image viewer application 138 (see FIG. 2G). Focus may then be restored to a viewable textual input element should the user begin navigating in any direction within the currently displayed image.

It can be noted that while the invention has been described in the context of the second mode of the user input providing alphanumeric character input, in general the second mode may provide any other function. As one non-limiting example, shortcut keys 5 and 0 may just zoom in/out on the focused element and not the entire document. Thus, in the second mode the user input may provide alphanumeric character input, or it may change the state of the document/object.

Various modifications and adaptations may become apparent to those skilled in the relevant arts in view of the foregoing description, when read in conjunction with the accompanying drawings and the appended claims. As one example, while the exemplary embodiments of this invention have been described primarily in the context of the zoom-in operation, these teachings can also be applied to a zoom-out operation, wherein the focus is placed on an item nearest the center of the display 140 unless that item is, for example, an activatable item such as a textual input element. As another example, the teachings of this invention can be applied whenever the viewable image on the display 140 changes, such as in response to execution of script file, where a currently focused item is caused to disappear from the display. As another example, the use of the teachings of this invention apply as well to three dimensional (3D) views of an object or a document, such as a 3D view of a document based on VRML (Virtual Reality Modeling Language), or a 3D game, where there may be items that can be activated by the pressing of one or more shortcut keys.

It should be further appreciated that the use of the exemplary embodiments of this invention apply as well to non-zoom type of operations, such as scrolling. In this case assume that the displayed document can be scrolled by the use of shortcut keys (e.g., 2, 4, 6, 8 as in some Java™ applications), and due to the scrolling operation a focused item disappears from the display. In this case the image viewer application 138 (or some equivalent document-related application, such as a word processor application or the browser 132 application itself) preferably shifts the focus to some item that is not activatable by the pressing of one of the scrolling keys (e.g., 2, 4, 6, 8), or alternatively removes the focus altogether from any item when a currently focused item is caused to disappear from the display 140 due to operation of the scrolling shortcut keys.

Further, the use of other types of activatable elements, other than textual input fields and links, may be employed, non-limiting examples of which include, but are not limited to, selection lists, radio buttons, checkboxes, form buttons, and embedded objects (such as Macromedia Flash™ content embedded in a web page). In addition, other types of browsers and other types of application software may be accommodated by the non-limiting embodiments of this invention. However, all such and similar modifications of the teachings of this invention will still fall within the scope of this invention.

Furthermore, some of the features of the examples of this invention may be used to advantage without the corresponding use of other features. As such, the foregoing description should be considered as merely illustrative of the principles, teachings, examples and exemplary embodiments of this invention, and not in limitation thereof.

What is claimed is:

1. A method, comprising:
receiving signals from a plurality of user inputs, where at least one user input is a multi-function input operable in a first mode to provide a display control input, and in a second mode to provide another function; and
when operating the at least one user input in the first mode, inhibiting operation of the at least one user input in the second mode, where inhibiting operation is performed automatically by a controller in response to a change in content shown on a display in response to operation in the first mode.

2. A method as in claim 1, where the plurality of user inputs comprise a plurality of keypad keys.

3. A method as in claim 1, where the first mode comprises a zoom function.

4. A method as in claim 1, where the first mode comprises a scroll function.

5. A method as in claim 1, where in the second mode the user input provides alphanumeric character input, and where inhibiting comprises, in response to a focused first element no longer appearing on the display, changing the focus to a second element that does appear on the display and that does not respond to alphanumeric character input.

6. A method as in claim 1, where inhibiting comprises, in response to a focused first element no longer appearing on the display, changing the focus to a second element that does appear on the display only in response to a user navigating within the display.

7. A method as in claim 1, executed in a portable handheld device.

8. A method as in claim 1, executed in a device where the user input comprises a keypad having keys 1-9, 0, * and #.

9. A method as in claim 1, executed in an electronic device that comprises a browser application capable of displaying an alphanumeric text entry element and a network link element, where the user input comprises a keypad having keys 1-9, 0, * and #, and where at least one of the keys in the first mode controls a display zoom function and in the second mode enters a corresponding alphanumeric character.

10. A device comprising at least one controller, at least one memory and an operating program configured to execute software routines, the software routines configured to cause the controller to:
    receive signals from a plurality of user inputs, where at least one user input is a multi-function input operable in a first mode to provide a display control input, and in a second mode to provide another function; and
    when operating the at least one user input in the first mode, inhibit operation of the at least one user input in the second mode, where inhibiting operation is performed automatically in response to a change in content shown on a display in response to operation in the first mode.

11. A device as in claim 10, wherein the plurality of user inputs comprise a plurality of keypad keys.

12. A device as in claim 10, wherein the first mode comprises a zoom function.

13. A device as in claim 10, wherein the first mode comprises a scroll function.

14. A device as in claim 10, wherein the second mode the user input provides alphanumeric character input, and wherein inhibiting operation comprises, in response to a focused first element no longer appearing on the display, changing the focus to a second element that does appear on the display and that does not respond to alphanumeric character input.

15. A device as in claim 10, wherein the inhibiting operation comprises, in response to a focused first element no longer appearing on the display, changing the focus to a second element that does appear on the display only in response to a user navigating within the display.

16. A device as in claim 10, embodied in a portable handheld device.

17. A device in claim 10, embodied in a device where the user input comprises a keypad having keys 1-9, 0, * and #.

18. A device as in claim 10, embodied in an electronic device that comprises a browser application capable of displaying an alphanumeric text entry element and a network link element, where the user input comprises a keypad having keys 1-9, 0, * and #, and where at least one of the keys in the first mode controls a display zoom function and in the second mode enters a corresponding alphanumeric character.

19. A device comprising a user interface having a visual display and a user input, further comprising a controller coupled to a memory and operating under control of a stored program to display an image to a viewer and to receive signals from a plurality of user inputs, where at least one user input is a multi-function input configured in a first mode to provide a display control input, and in a second mode to provide another function; said controller when operating the at least one user input in the first mode, inhibiting operation of the at least one user input in the second mode, where inhibiting operation is performed automatically in response to a change in content shown on the visual display in response to operation in the first mode.

20. A device as in claim 19, where the plurality of user inputs comprise a plurality of keypad keys.

21. A device as in claim 19, where the first mode comprises a zoom function.

22. A device as in claim 19, where the first mode comprises a scroll function.

23. A device as in claim 19, where in the second mode the user input provides alphanumeric character input, and where inhibiting operation comprises, in response to a focused first element no longer appearing on the display, changing the focus to a second element that does appear on the display and that does not respond to alphanumeric character input.

24. A device as in claim 19, where inhibiting operation comprises, in response to a focused first element no longer appearing on the display, changing the focus to a second element that does appear on the display only in response to a user navigating within the display.

25. A device as in claim 19, comprising a portable handheld device.

26. A device as in claim 19, where the input comprises a keypad having keys 1-9, 0, * and #.

27. A device as in claim 19, where the memory stores program code for implementing a browser application configurable for displaying an alphanumeric text entry element and a network link element, where the input comprises a keypad having keys 1-9, 0, * and #, and where at least one of the keys in the first mode controls a display zoom function and in the second mode enters a corresponding alphanumeric character.

28. Apparatus comprising a user interface means comprised of visual display means and input means, further comprising a controller means coupled to memory means and operating under control of a stored program for displaying an image to a viewer and for receiving signals from a plurality of user input means, where at least one user input means comprises a multi-function input operable in a first mode to provide a display control input, and in a second mode to provide another function; said controller means, when operating the at least one user input means in the first mode, inhibiting operation of the at least one user input means in the second mode, where inhibiting operation is performed by the controller means automatically in response to a change in content shown on the visual display means in response to operation in the first mode.

29. Apparatus as in claim 28, where the plurality of user input means comprise a plurality of keypad keys comprising 1-9, 0, * and # keys.

30. Apparatus as in claim 28, where the first mode comprises at least one of a zoom function and a scroll function.

31. An apparatus comprising at least one controller and at least one memory including an operating program for executing software routines the at least one memory and the operating program configured to, with the at least one controller cause the apparatus to at least perform:
    receive signals from a plurality of user inputs, where at least one user input is a multi-function input operable in a first mode to provide a display control input, and in a second mode to provide another function; and
    when operating the at least one user input in the first mode, inhibiting operation of the at least one user input in the second mode, where inhibiting operation is performed by a controller automatically in response to a change in content shown on a display in response to operation in the first mode.

32. An apparatus according to claim 31, where the user input comprises a plurality of keypad keys comprising 1-9, 0, * and # keys.

33. An apparatus according to claim 31, where the first mode further comprises a scroll function.

34. An apparatus according to claim 31, where in the second mode the user input provides alphanumeric character input, and where inhibiting operation comprises, in response to a focused first element no longer appearing on the display, changing the focus to a second element that does appear on the display and that does not respond to alphanumeric character input.

35. An apparatus according to claim 31, where the inhibiting operation comprises, in response to a focused first element no longer appearing on the display, changing the focus to a second element that does appear on the display only in response to a user navigating within the display.

36. An apparatus according to claim 31, embodied in an electronic device.

37. An apparatus according to claim 31, embodied in a portable handheld communications device.

* * * * *